United States Patent [19]
Garner

[11] Patent Number: 4,574,515
[45] Date of Patent: * Mar. 11, 1986

[54] FISHING BOBBER

[76] Inventor: Donald R. Garner, 760 Carla St., Livermore, Calif. 94550

[*] Notice: The portion of the term of this patent subsequent to Sep. 27, 2000 has been disclaimed.

[21] Appl. No.: 592,524

[22] Filed: Mar. 23, 1984

[51] Int. Cl.⁴ ............................................. A01K 93/00
[52] U.S. Cl. .................................. 43/43.11; 43/44.95
[58] Field of Search .................. 43/43.11, 43.1, 44.92, 43/44.95

[56] References Cited

U.S. PATENT DOCUMENTS

| | | | |
|---|---|---|---|
| 2,720,720 | 10/1955 | Landrum | 43/43.11 |
| 3,144,729 | 8/1964 | Jonassen | 43/43.11 |
| 3,425,151 | 2/1969 | Salfer | 43/43 |
| 4,406,081 | 9/1983 | Garner | 43/43 |

FOREIGN PATENT DOCUMENTS

| | | | |
|---|---|---|---|
| 98285 | 5/1961 | Norway | 43/43.11 |
| 98286 | 5/1961 | Norway | 43/43.11 |

*Primary Examiner*—Gene P. Crosby
*Attorney, Agent, or Firm*—Thomas Schneck

[57] ABSTRACT

A cone-shaped fishing bobber features a fixed line retention member and a releasable leader line retention member. A movable plunger in the central bore of the bobber retains the fishing line by a slot and a movable ring at the plunger top. The releasable leader line retention member comprises a movable rigid wire set in the plunger bottom so as to bridge a recessed spool area at the cone base. Leader line is wound on the spool and held in place by the rigid wire during casting and released by the plunger and wire dropping down when the bobber hits the water. In the water the cone shape gives indication of the direction of current flow. The retention of the fishing line at the narrow end of the cone causes the cone to flip base-side-up when the weight of a fish attaches to the line. Ballast may be provided within the base of the cone body. The retainer ring and the movable rigid wire present no protruding parts to cause entanglement of the fishing line.

5 Claims, 5 Drawing Figures

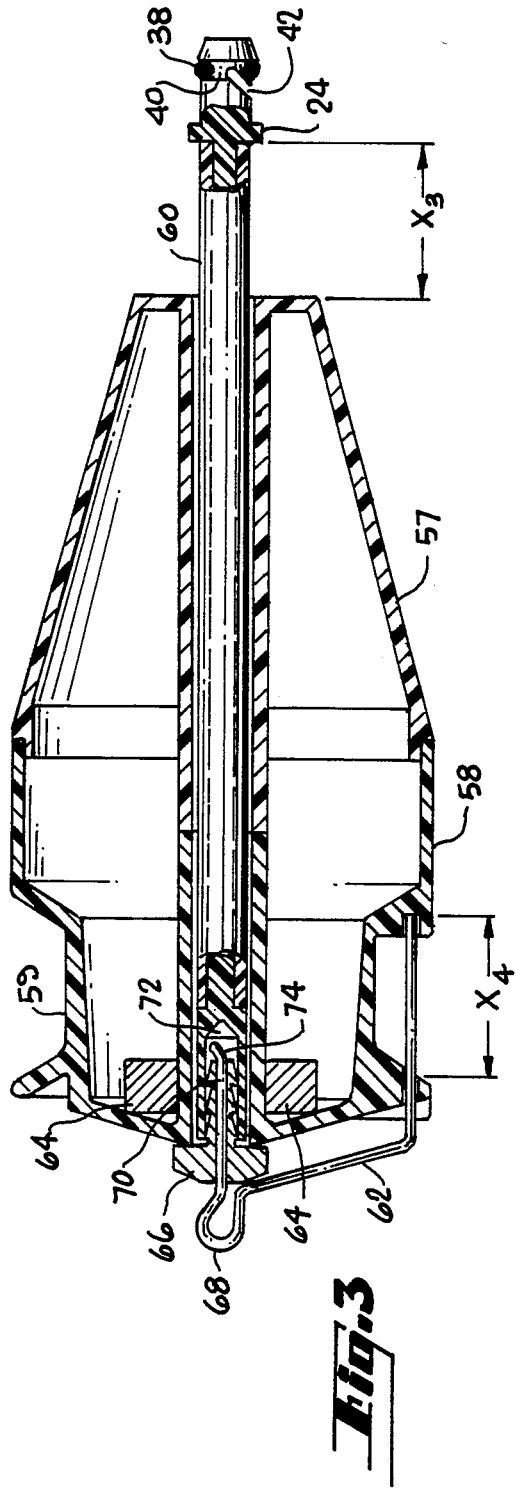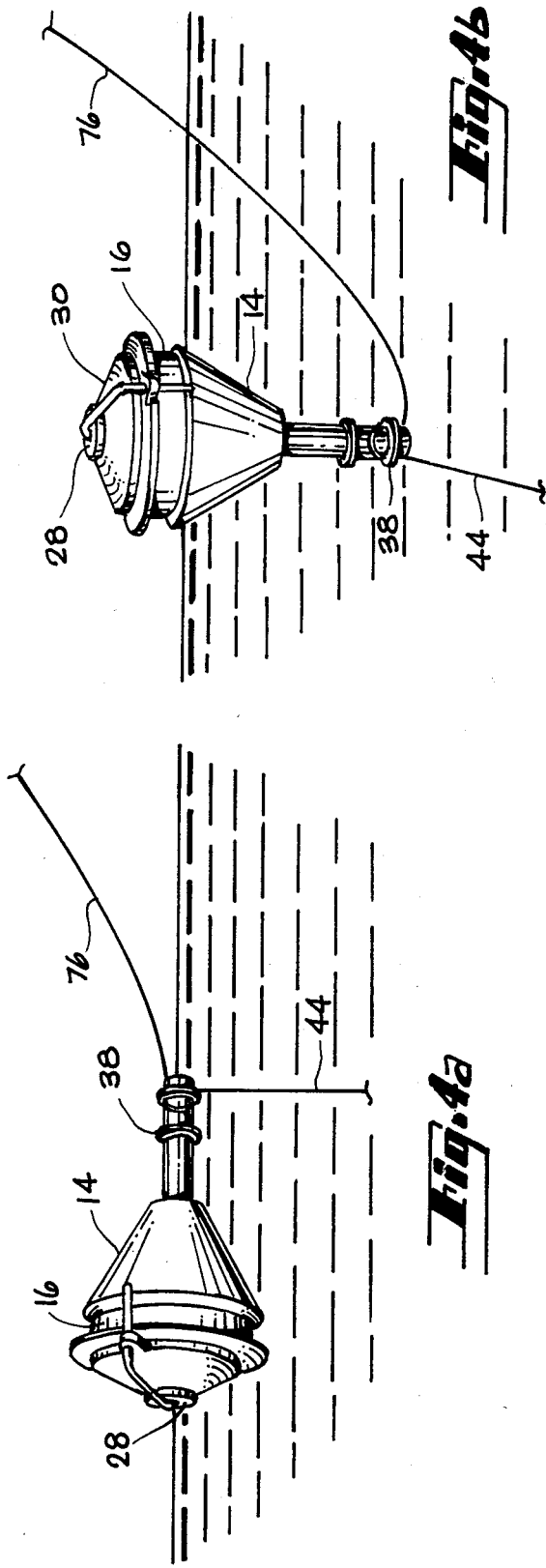

FISHING BOBBER

DESCRIPTION

1. Technical Field

The invention relates to fishing bobbers and in particular to a fishing bobber having a line release mechanism for a fixed length of fishing line.

2. Background Art

Line release fishing bobbers of the prior art usually employ sinkers on the fishing line to aid in the release of the predetermined length of the fishing leader when the bobber hits the water. These weights are easily lost and may get caught in the line release mechanism, entangling the line. Line retention members which are sometimes used to attach a bobber to the line may have edges in which the fishing leader gets entangled during line release or casting. Frequently a bobber spins upon casting, causing rotation of the line retention member and fouling of the line attached thereto.

It is the object of the invention to devise a line release bobber which would provide for immediate line release when the bobber hits the water without use of sinker weights on the line leader. Another object of the invention is to devise a line release bobber having a shape that would readily indicate current flow direction and placement of the leader and hook in the water. It is another object of the invention to devise a line release bobber having no entangling protrusions on the line retention area. It is another object of the invention to devise a fishing bobber having a line release mechanism which does not cause the line to foul when releasing line.

DISCLOSURE OF THE INVENTION

The above objects have been met by a line release bobber having a hollow cone shape, at the top of which is a line retention member consisting of a slot and a retaining ring for holding the line fixed in the slot. A predetermined length leader line with hook is wound around a spool recessed in the base of the cone and held there by a movable rigid wire clip spanning the spool. The wire clip is rotatably attached through a weighted cap to the bottom of a central plunger in the cone. The top of the plunger has a slot and a retaining ring for holding the end of the leader line fixed in the slot. The fishing line is easily wound on the bobber on outside surfaces with no threading required. After winding on the spool, the plunger is pulled up thereby engaging the rigid wire clip through two holes on opposite rims of the spool area, forming a positive locking, preventing line from slipping out during casting. The cone carrying the wound leader line on the spool and the wire clip rotate freely around the plunger holding the line retention end. When cast, a ballast weight at the bottom of the plunger causes it to drop a fixed distance from the buoyant cone, thereby quickly releasing the wound leader line as the spool spins with the weight of the descending hook and bait. In the water the wide cone base points in the direction of the current flow and location of the hook, which are thus easily determined. Due to placement of the line retainer at the narrow end of the cone, the cone will flip base-side-up when the weight of a fish attaches to the line. In addition to the weighted cap, ballast may be added inside the base of the spool during manufacture.

BRIEF DESCRIPTION OF THE DRAWINGS

FIG. 3 is a side cutaway view of an alternative embodiment of the bobber of the present invention.

FIGS. 4a and 4b are side elevations of the bobber in use.

BEST MODE FOR CARRYING OUT THE INVENTION

Figure 1:
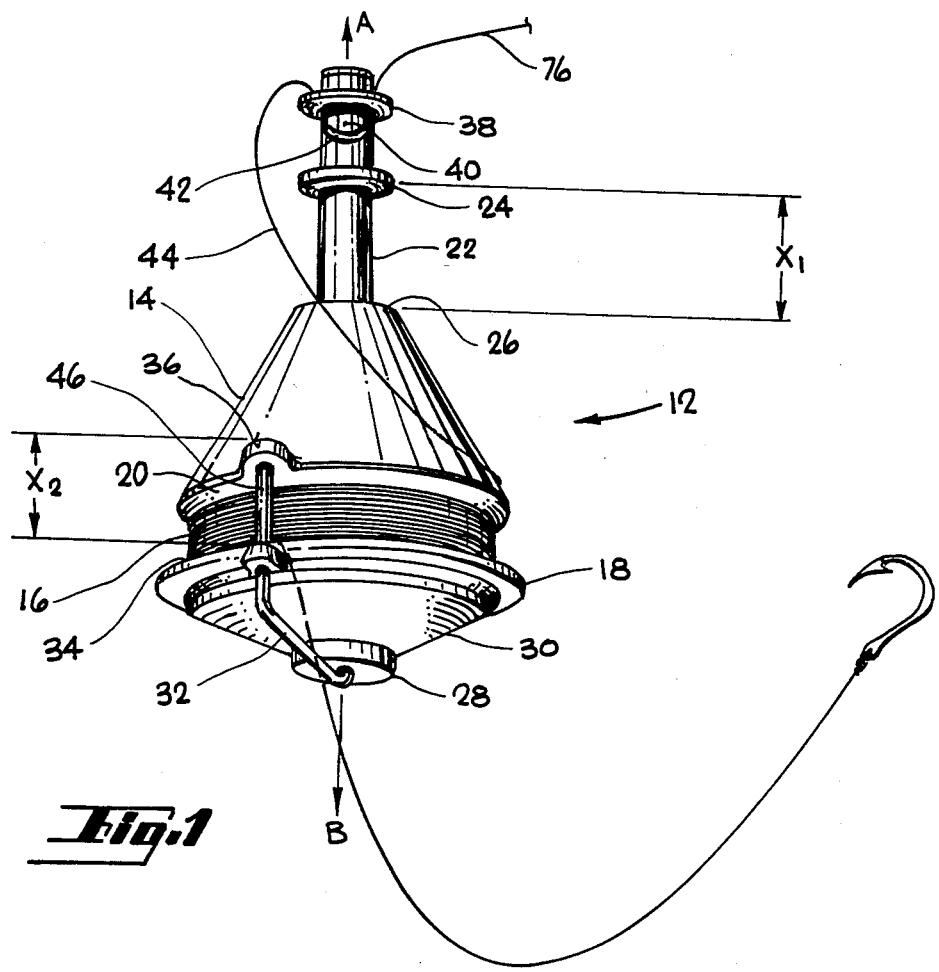
FIG. 1 is a side elevation of the line release bobber of the present invention.

With reference to FIG. 1, one embodiment of the line release fishing bobber 12 is shown. The main body of the fishing bobber consists of a buoyant, generally hollow, cone 14 at the base of which is a recessed spool area 16. One rim of the spool area is defined by the bottom flange 18 of the cone and the upper rim of the spool area is defined by flange 20 distal to the base of the cone. A central hollow bore 21 in the cone holds a plunger 22 of smaller diameter than the diameter of the bore, thereby allowing free travel of the plunger up and down in the bore. The distance of free travel of the plunger in the bobber bore is shown as X1. This is equal to X2, the length of a wire segment 46 above rim 18, the segment being part of a movable rigid wire clip 32. The degree of travel of the plunger in the bore is defined by a retainer flange 24 at one end of the plunger proximate to the narrow top area of the cone 26. The other end of the travel is defined by a cap 28 set in the base of the plunger at the base 30 of the cone. The cap is of slightly larger diameter than the diameter of the bore in the cone, thereby restricting the upward travel of the plunger in the bore. Wire clip 32 is rotatably attached to the base of the plunger through the center of the cap. The wire clip is bent at two approximately right angles so as to curve back upward to bridge the spool area 16 of the cone when the plunger is in the extreme upward position in the direction of arrow A so that the cap is firmly against the base of the cone. The wire segment 46 bridges both rims 18 and 20 of the spool area. Small holes 34 and 36 act to seat the wire clip in the spool rims. At the top of the plunger a resilient retainer ring 38 is held in a circumferential groove 40 which encircles one end of an oblique slot 42 cut below in the plunger end.

In order to wind the fishing line 44 on the bobber, the plunger is dropped in the direction of arrow B a distance X1, thereby dropping the end of the wire 46 the distance X2 providing access to the spool area. The retainer ring 38 is rolled down toward flange 24 on the plunger, thereby allowing access to oblique slot 42. Sufficient fishing line is measured off for the desired leader line and then caught by placing the line in the oblique slot and rolling up the retainer ring so as to lock it in place. The leader line is then wound around the recessed spool area 16 at the base of the fishing bobber. The plunger is then raised up in the direction A thereby locking the wound fishing leader line in the spool area by means of wire end 46 extending through the two holes in the spool rims. During casting the plunger is kept in the position shown in FIG. 1 by tension on the retained line in slot 42 from the fishing rod. When cast, buoyancy of the cone causes it to float on the water. Tension is relieved on the plunger and it drops in the direction of arrow B, thereby causing the wire segment 46 to fall out of hole 36, releasing the leader line and hook. The bobber cone will tend to spin during the release of the leader line, aiding a quick release. Due to the rotatable fit of the wire clip in the plunger base, the plunger itself does not rotate as the cone and spool spin dispensing the leader line. This avoids entanglement of the leader line with the upper part of the plunger.

Figure 2:
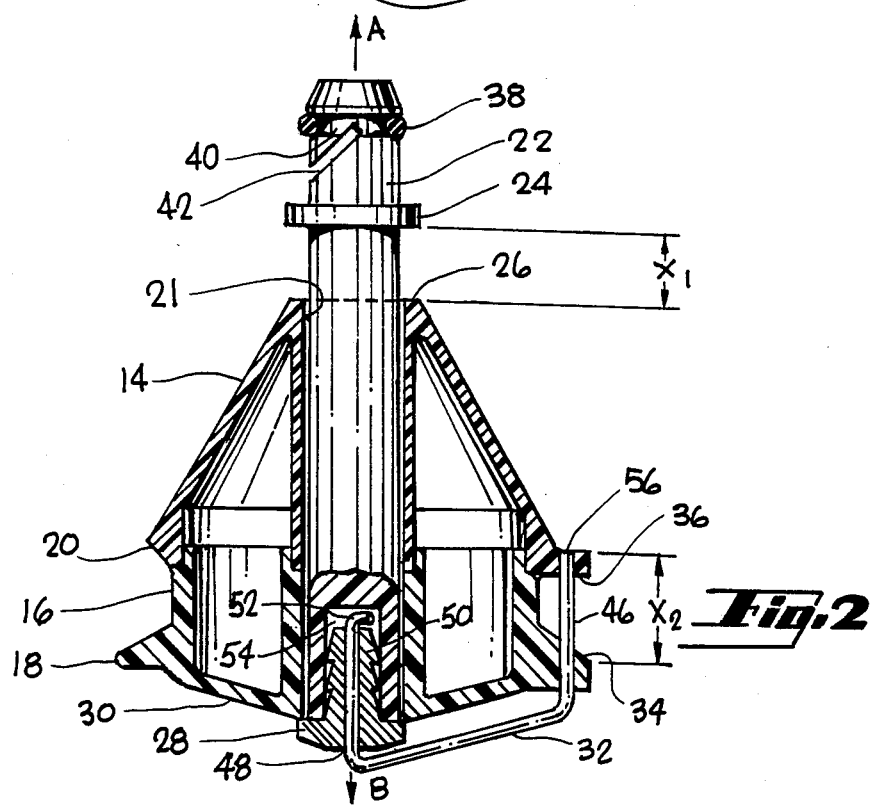
FIG. 2 is a side cutaway view of the bobber of FIG. 1.

With reference to FIG. 2, wire clip 32 is shown rotatably mounted through opening 48 in cap 28. A right-angle bend 52 at the end of the wire clip retains the wire clip 32 in fluted ribs 50 within cylindrical well 54 set in the base of the plunger. The wire clip rotates freely in the fluted ribs within the plunger. At the top of plunger 22 is shown the overlapping of the oblique slot and circumferential groove whereby the end of the leader line is fastened. Ballast weights, such as lead, may be incorporated in cap 28 to aid in quicker travel of the plunger downward in order to release the leader line when the bobber hits the water. When the plunger drops in the direction of arrow B, wire clip 32 drops the distance X2. This places end 56 of the wire within the hole 34, thereby eliminating any possibility of line entanglement on the end of the wire.

With reference to FIG. 3 an alternate embodiment of the fishing bobber of the present invention is shown. For fishing in deeper water, such as bay or ocean, a longer leader line is usually required. For this purpose a wider spool area provides for a longer length of leader line to be wound on the bobber. Cylindrical section 58 is inserted between the upper body 57 of the cone and the recessed spool area 59. This allows use of a longer length plunger 60 having a greater degree of travel denoted as X3. When the plunger drops in the direction of arrow B the wire clip 62 will drop the distance X4 with the release of the leader line wound on the spool area. The elongation of the cone by means of cylindrical section 58 provides protection for the extra length plunger to avoid excess length extending out of the fishing bobber. To aid in quick release of the fishing line, ballast 64 may be incorporated inside the bobber at the base of the spool area. Additional ballast may be added to cap 66 or attached at loop 68 of wire clip 62. Wire clip 62 is rotatably mounted through cap 66 in well 72 of plunger 60 by means of fluted ribs 70 which allow free rotation within the plunger. Bend 74 at the inside end of the wire retains the wire within the fitting.

FIG. 4a and FIG. 4b show the fishing bobber in use in water. The leader 44 has unwound from spool area 16 and the bobber is retained on the line 76 by means of the ring 38 at the top of the plunger. The combination of the tension caused by the fishing bait and hook on leader line 44 and the tension of the fishing pole on line 76 causes the plunger to again travel in the direction of arrow A. Flowing currents will tend to push the buoyant bobber towards the end of the plunger where it is held by cap 28. As shown in FIG. 48, when a fish is caught by the hook on the leader, the weight of the fish pulls the plunger end down below the water surface, flipping the base of the cone upward, thereby indicating a catch on the line. Due to the cone shape, the direction of travel of the fish is easily pointed out.

The line release bobber body may be molded in one piece from a plastic such as acrylonitrile-butadiene-styrene resin. By molding the body of the cone separately, it is possible to form the bobber of two contrasting colors for better visibility in the water. The plunger with groove, slot, and flange may also be molded in one piece. Cap and wire clip may be a metal such as brass. The ballast weights may be used in the cone base for additional weight. The resilient retainer ring may be formed of neoprene rubber. The taper of the cone may be elongated as shown in FIG. 3 for deep sea or bay fishing, in order to lessen the bouncing of the bobber in rougher water.

I claim:

1. A line release bobber comprising,
   an elongated buoyant cone, the base of said cone forming a recessed spool, said cone having a central hollow bore,
   a plunger set in said bore, of greater length than said bore, having travel limiting members at each end outside the bore, the plunger having an upper portion defining a slot,
   a wire clip attached to one end of said plunger, having one end bent so as to bridge the spool area, forming a releasable line retention member at one end of said bobber, said member being released by means of the travel limiting members of the plunger, said wire clip being rotatably attached to said plunger, thereby allowing rotation of said wire and said cone about said plunger, and
   a resilient ring movably disposed over the slot in the upper portion of said plunger, thereby forming a fixed line retention member.

2. The bobber of claim 1 wherein said wire clip is releasably attached to said cone in said bridge area through holes set in the upper and lower rims of said spool area.

3. The bobber of claim 2 wherein said holes are set apart at a distance equal to the travel distance of said plunger.

4. A line release bobber comprising,
   an elongated buoyant cone having at the base a spool-shaped recessed area, one rim of said spool defined by the cone base and the other rim defined by a flange at the spool end distal to the base, said cone having a center hollow bore running from the cone top through the spool end, a movable plunger set in said bore having a retainer flange at the top of said plunger above said bore and attached to a cap of wider diameter at the bottom below said bore,
   a wire clip attached to the plunger through said cap, said wire clip bending around the base of the cone and turning upward through a hole in the rim at the base of said cone to bridge the recessed spool area, the wire clip set in said plunger so as to allow free rotation of said wire clip and cone around the plunger,
   said retainer flange and said cap spaced apart at a distance on said plunger, thereby allowing travel of said plunger in said bore of a distance sufficient to drop the wire below the recessed area of the spool, to be retained within said hole in the base of the cone,
   said plunger having an upper portion defining a slot for receiving fishing line and a movable resilient ring covering the slot.

5. The bobber of claim 4 wherein said wire clip is rotatably mounted in said plunger by means of fluted ribs inside the bottom of said plunger.

* * * * *